(12) United States Patent  
Matsumoto

(10) Patent No.: US 7,529,396 B2  
(45) Date of Patent: May 5, 2009

(54) METHOD, COMPUTER PROGRAM PRODUCT, AND APPARATUS FOR DESIGNATING REGION OF INTEREST

(75) Inventor: Kazuhiko Matsumoto, Tokyo (JP)

(73) Assignee: Ziosoft Inc. (JP)

( * ) Notice: Subject to any disclaimer, the term of this patent is extended or adjusted under 35 U.S.C. 154(b) by 728 days.

(21) Appl. No.: 11/324,055

(22) Filed: Dec. 30, 2005

(65) Prior Publication Data

US 2006/0181551 A1     Aug. 17, 2006

(30) Foreign Application Priority Data

Jan. 7, 2005     (JP)     ............... 2005-002981

(51) Int. Cl.
*G06K 9/00*     (2006.01)

(52) U.S. Cl. .................. 382/128; 128/922; 378/4

(58) Field of Classification Search .......... 382/100, 382/103, 128, 130, 131, 132, 154, 181, 190, 382/195, 203, 254, 256, 257, 258; 128/922; 345/587; 378/4–27

See application file for complete search history.

(56) References Cited

U.S. PATENT DOCUMENTS 5,793,375 A * 8/1998 Tanaka ................ 345/426

6,807,292 B1 * 10/2004 Goto et al. ............. 382/128
2004/0096088 A1 * 5/2004 Kohle .................. 382/128
2006/0002626 A1 * 1/2006 Matsumoto ........... 382/276

FOREIGN PATENT DOCUMENTS

| JP | 01-134580 | 5/1989 |
| JP | 08-212391 | 8/1996 |
| JP | 11-318884 | 11/1999 |
| JP | 2001-250133 | 9/2001 |
| JP | 2006-075216 | 3/2006 |

* cited by examiner

*Primary Examiner*—Anand Bhatnagar
(74) *Attorney, Agent, or Firm*—Caesar, Rivise, Bernstein, Cohen & Pokotilow, Ltd.

(57) ABSTRACT

A method for designating a region of interest from volume data of a subject. When a user clicks a mouse to specify designation points, a CPU generates a curved surface including the designation points. The CPU executes a hidden surface removal process on the curved surface to generate a plotted region, sets a thickness for the plotted region, and determines the region of interest. The CPU performs MIP processing on the region of interest and a region of interest re-designating process on the MIP image. In the region of interest re-designating process, the user clicks the mouse on the MIP image, and the CPU determines the MIP position of the clicked position. The CPU sets the MIP position as a new designation point, and re-specifies a new region of interest by performing a region of interest designating process based on the new designation point.

36 Claims, 9 Drawing Sheets

Fig. 4
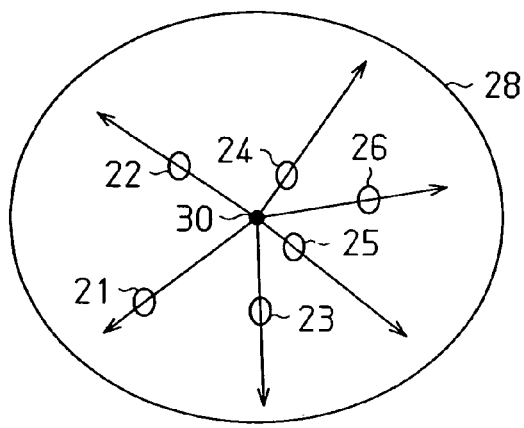
Fig. 5
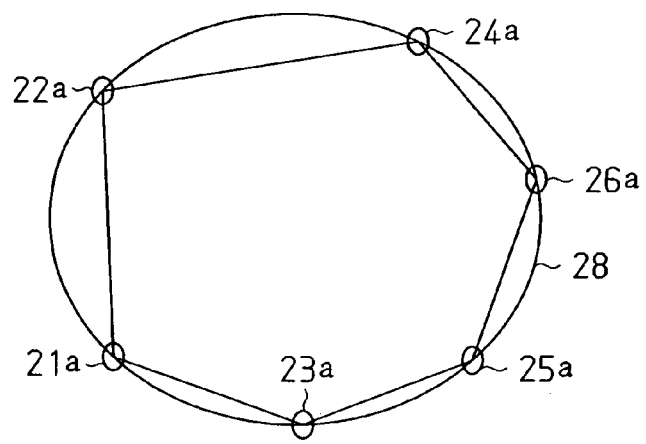
Fig. 6
Fig. 7
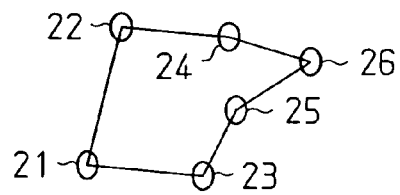

METHOD, COMPUTER PROGRAM PRODUCT, AND APPARATUS FOR DESIGNATING REGION OF INTEREST

CROSS-REFERENCE TO RELATED APPLICATIONS

This application is based upon and claims the benefit of priority from prior Japanese Patent Application No. 2005-002981, filed on Jan. 7, 2005, the entire contents of which are incorporated herein by reference.

BACKGROUND OF THE INVENTION

The present invention relates to a method, a computer program product, and an apparatus for designating region of interest of a subject, such as an internal organ.

Conventionally, medical image information having three or more dimensions (volume data) is generated and visualized by medical diagnostic imaging devices, such as X-ray diagnostic devices, X-ray CT devices, magnetic resonance imaging devices (MRI devices) and the like. Visualized information is used to diagnose and treat illness. It is difficult to effectively visualize internal body areas since volume data is configured by data of tightly packed elements (voxel) having three or more dimensions. In general, there are two well known methods to visualize volume data. One is to extract a region of voxel data subjected to visualization, that is, a region of interest (ROI). Then, voxel data included in ROI can be rendered by raycast or any other volume rendering method. The other is to cut out two-dimensional plane in volume data and render voxels on the plane.

Although the region of interest can be set by region extraction, there are many region extraction methods considered suitable for subjects such as internal organs and substances. One example of region extraction is described below. First, the volume data configured by voxels having variable density values are binarized by a predetermined threshold value to generate binary voxel data. Thereafter, light rays are extended perpendicular to the binary voxel data, the lengths of the rays to voxels (region of interest voxel) having a value of "1" are determined, and a depth image is generated from the lengths of the rays to each pixel. Then, coordinates of the surface of the display subject are reversely calculated from the depth image, a surface normal line is determined and shadowed based on the voxel values of certain voxel data and the voxel values of adjacent voxel data to generate a surface display image (for example, refer to U.S. Patent Publication No. 5,793,375).

Multi planar reconstruction (MPR) is a two-dimensional extraction method. MPR is a method for extracting and displaying arbitrary cross-sectional planes of voxel data, for example, a slice image of a cross-section that differs from a plurality of slice images (CT images) imaged on a horizontal cross-section.

Since MPR represents an arbitrary cross-sectional plane, however, it is difficult to observe a subject that is on a curved surface and not on a flat surface, as in the case, for example, of blood vessels on the surface of internal organs. A region of interest between two flat planes is cut out from the volume data, and this region of interest is subjected to slab MIP, in which a MIP (max intensity projection) process is performed. In MIP, an optical path is set so as to pass through voxel data. Then, the maximum data (pixel value of each pixel of medical image information) on the optical path are displayed as a MIP image. Since the MIP process is limited to a region of interest between two planes in the voxel data, from the viewpoint that a thick plane region can be expressed, slab MIP is an intermediate method with respect to visualization methods the extract a two-dimensional plane and visualization methods using a region of interest. Although slab MIP allows easy observation of a subject that zigzags through a region between two flat planes, such as a blood vessel, the observation range is restricted to being within a predetermined observable region.

Furthermore, a curved cross-section can be visualized by CPR (curved multi planar reconstruction). CPR is a method for extracting and displaying a curved section of voxel data, for example, when observing a blood vessel, a curved section can be extracted so as to enable a blood vessel to always be displayed in cross-section. Freedom of selecting the curved surface is limited since the curved surface generated by CPR is displayed as a collection of parallel lines on a single curve. Therefore, although it is possible, for example, to generate a curved section including a single blood vessel, it is not possible to express a curved surface that includes a plurality of curves, as in the case of a branching blood vessel and the like. Furthermore, even when one blood vessel is displayed using CPR, a surface along the blood vessel must be specified by an operation performed by the user. This increases the labor involved in display and observation.

SUMMARY OF THE INVENTION

It is an object of the present invention to provide a method for designating region of interest, a program for designating a region of interest, and an apparatus for designating a region of interest.

One aspect of the present invention is a method for designating a region of interest of a subject from volume data of the subject through at least one of sole processing and dispersed processing performed by at least one computer. The volume data of the subject includes coordinates of voxels and has three or more dimensions. The method includes designating a plurality of designation points from the coordinates of the voxels with the at least one computer, generating a curved surface including the designation points by connecting the designation points with the at least one computer, and designating the region of interest by adding thickness to the curved surface with the at least one computer.

Another aspect of the present invention is a method for designating a curved surface layer of an internal organ to visualize a volume rendered image of the curved surface layer with at least one computer. The method includes storing voxel data of the internal organ with voxel values, which correspond to a physical property of the internal organ, and coordinate values in the at least one computer, generating a two-dimensional or volume rendered image of the internal organ from the voxel data to display the two-dimensional or volume rendered image on a screen with the at least one computer, designating a plurality of designation points on the displayed two-dimensional or volume rendered image as instructed by a computer operator with the at least one computer, connecting the designation points by a closed line with the at least one computer, determining a curved surface including the designation points and the closed line with the at least one computer, adding a thickness to the curved surface to determine a three-dimensional plotted region corresponding to the surface layer of the internal organ with the at least one computer, and generating a volume rendered image of the curved surface layer of the internal organ corresponding to the determined three-dimensional plotted region in accordance with voxel data having coordinates corresponding to the determined three-dimensional plotted region.

A further aspect of the present invention is a computer readable program product including computer readable media storing program code for designating a region of interest of a subject from volume data of the subject through at least one of sole processing and dispersed processing performed by at least one computer. The volume data of the subject includes coordinates of voxels and has three or more dimensions. The program code when executed by the at least one computer performs steps including designating a plurality of designation points from the coordinates of the voxels with the at least one computer, generating a curved surface including the designation points by connecting the designation points with the at least one computer, and designating the region of interest by adding a thickness to the curved surface with the at least one computer.

Another aspect of the present invention is a computer system including at least one computer for designating a region of interest of a subject from volume data of the subject through at least one of sole processing and dispersed processing. The volume data of the subject includes coordinates of voxels and has three or more dimensions. The at least one computer includes means for designating a plurality of designation points from the coordinates of the voxels, means for generating a curved surface including the designation points by connecting the designation points, and means for designating the region of interest by adding a thickness to the curved surface.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 4 to 7 illustrate a curved surface generating process of the first embodiment;

DETAILED DESCRIPTION OF THE PREFERRED EMBODIMENTS

First Embodiment

A first embodiment of the present invention will now be described with reference to FIGS. 1 to 17.

Figure 1:
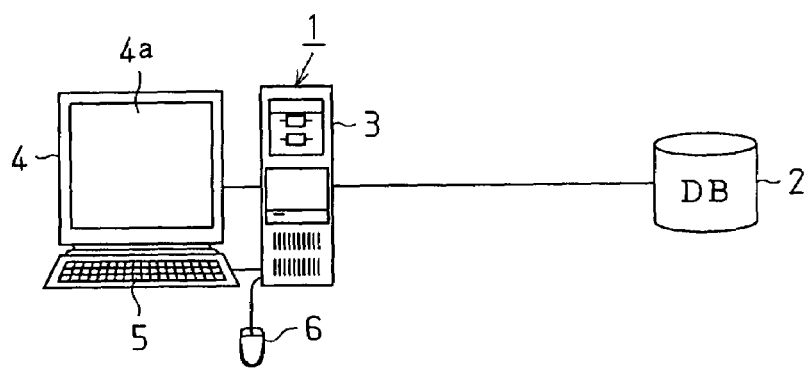
FIG. 1 is a schematic diagram showing an image display device according to a first embodiment of the present invention.

As shown in FIG. 1, an image display device 1 reads CT image data captured by a CT (computerized tomography) image capture device from, for example, a database 2. The image display device 1 then generates and displays various types of medical diagnostic images. Although CT image data is used as an example in the present embodiment, the present invention is not limited to this example. That is, the image data used is not limited to CT image data, and may be data obtained by medical imaging devices, such as MRI (magnetic resonance imaging) and the like, and combinations thereof.

The image display device 1 includes a calculator (computer, workstation, personal computer) 3, a monitor 4, and an input device such as a keyboard 5 and mouse 6. The calculator 3 is connected to a database 2.

Figure 2:
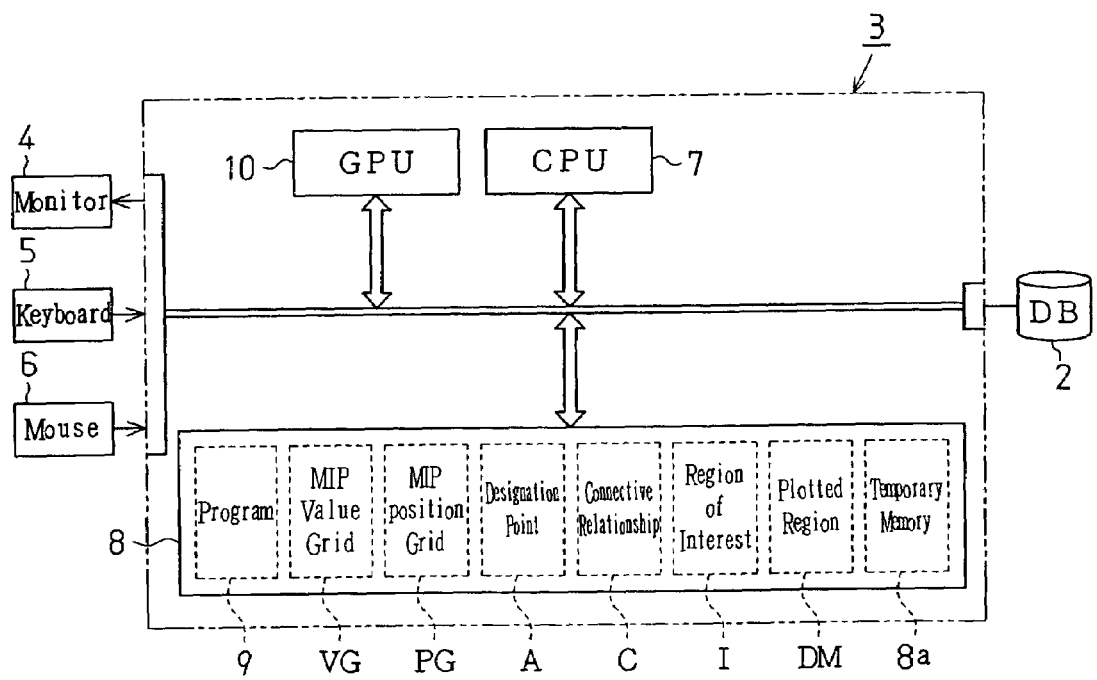
FIG. 2 is a block diagram of the image display device in the first embodiment.

FIG. 2 schematically shows the structure of the image display device 1. The calculator 3 includes a CPU (central processing unit) 7 and a memory 8, such as a hard disk or the like. A program (application program) 9 for executing a region of interest designating process is stored in the memory 8. The memory 8 includes a temporary memory unit 8a for temporarily storing voxel data as the volume data of three or more dimensions obtained from CT image data read from the database 2 or the hard disk. The temporary memory unit 8a also temporarily stores the thickness of the region of interest and the volume rendered image, which is obtained by performing a volume rendering process on voxel data. The memory 8 further includes a MIP value grid memory unit VG, which stores pixel MIP values on a two-dimensional screen, and a MIP position grid memory unit PG, which stores MIP positions, that is, coordinates of the MIP values, stored in the MIP value grid memory unit VG. The memory 8 further includes a designated point memory unit A, which stores the three-dimensional coordinates of a designated point for specifying a desired region among the voxel data subjected to the volume rendering process. Moreover, the memory 8 is provided with connective relationship memory unit C for storing connective relationships of designation points when generating a curved surface that connects all designation points, a region of interest memory unit I for storing regions of interest including all designation points, and a plotting subject region memory unit DM for storing plotting subject regions in the region of interest.

The CPU 7 executes a region of interest designating process for designating a region of interest from the voxel data obtained from the CT image data acquired from the database 2 by running the program 9. In the present embodiment, the CPU 7 (calculator 3), which functions as a region of interest designating device, executes the region of interest designating program of the region of interest designating process (designating stage, curved surface generating stage, region of interest designating state, projection surface generating stage, region of interest re-designating stage, region of interest selecting stage, ray setting stage, new designated point specifying stage and the like). Thus, the CPU 7 (calculator 3) functions as a designating means, a curved surface generating means, a region of interest designating means, a projection surface generating means, a region of interest re-designating means, a region of interest selecting means, a ray setting means, and a new designated point designating means.

Figure 3:
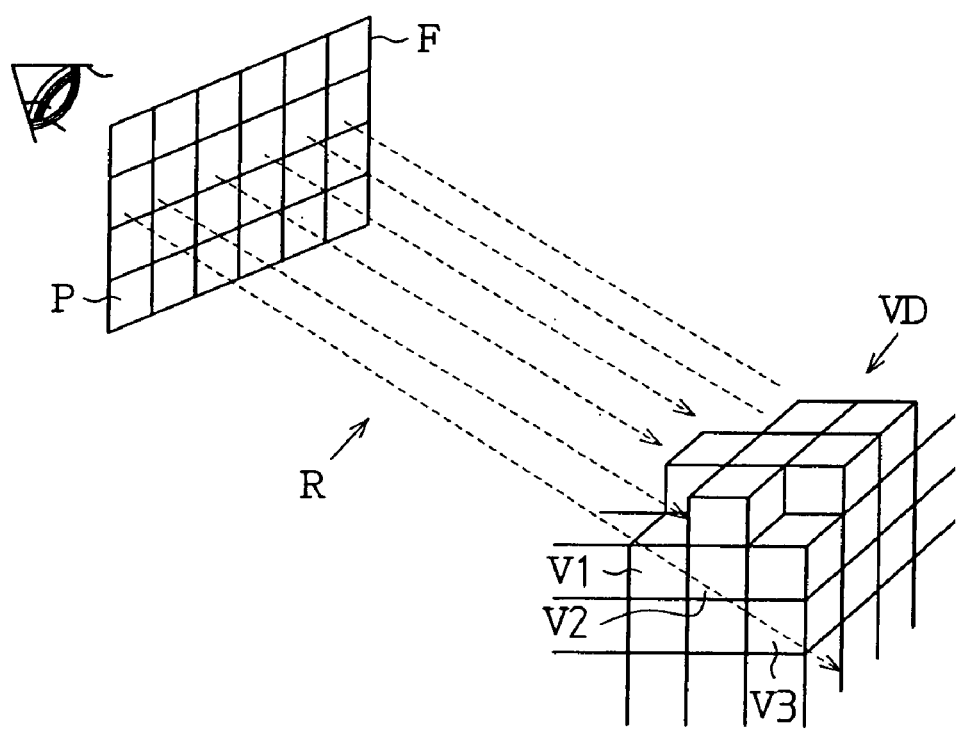
FIG. 3 illustrates an MIP of the first embodiment.

The volume data VD is a collection of voxels, which function as pixels in three or more dimensions, and the pixel values are allocated as voxel values to three-dimensional grid points, as shown in FIG. 3. In the present embodiment, for example, the pixel values of the CT image data, that is, the CT values are used directly as pixel values. In four-dimensional volume data, volume data can be expressed as a sequence of three-dimensional grids.

Although CT image data is generated by imaging sections of the human body of a patient or the like to show a two-dimensional tomographic image of bones, blood vessels, organs or the like, three-dimensional volume data is obtained by the entirety of a plurality of adjacent slices (sections). Accordingly, CT image data is defined below as three-dimensional volume data including a plurality of slices.

The CT image data has different CT values for tissues (bone, blood vessels, organs), or the subjects. The CT values are X-ray attenuation coefficients of tissue expressed based on water, and the type of tissue and lesion and the like may be determined by the CT value. The CT value represents a physical property of the subject. Furthermore, the CT image data includes all coordinate data of the section image (slice image) of the human body obtained by a CT scan performed by a CT imaging device, such that the positional relationship among different tissues in the viewing direction (depth direction) may be determined from the coordinate data. That is, the voxel data includes CT values (hereinafter referred to as voxel values) and coordinate data.

Figure 17:
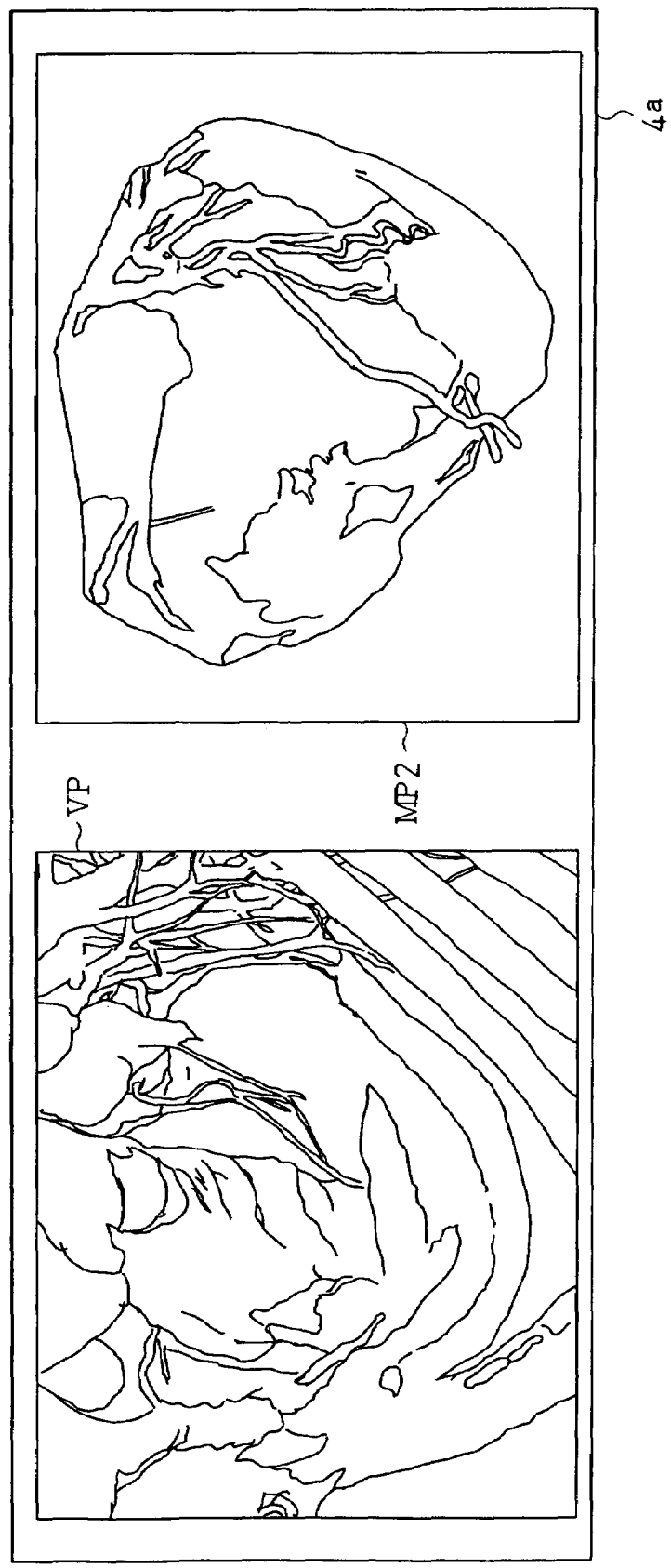
FIG. 17 illustrates a MIP image after the region of interest re-designating process in the first embodiment.

In the present embodiment, the volume data VD is subjected to a volume rendering image generating process executed by the CPU 7, and the generated volume rendered image (hereinafter referred to as 'VR image') VP is stored beforehand in the temporary memory unit 8a, as shown in FIG. 17. Since the VR image VP is generated by a well known method, such as volume rendering or the like, detailed description of this process is omitted. Then, after execution of a region of interest designating process, which will be described later, the VR image VP and the region of interest in the VR image VP (volume data VD) are shown on the monitor 4 (screen 4a) side by side with a MIP image MP2 as a projection image of the MIP processed image or a two-dimensional image.

The region of interest is part of the region having a predetermined thickness on a curved surface, such as the surface of an organ or the like. The region of interest is generated by the region of interest designating process, and a MIP image MP1 (refer to FIG. 10) is displayed for observation of subjects within the region of interest after subjecting the region of interest to a MIP process. A new region of interest may be designated by executing a similar region of interest designating process on the MIP image MP1. A new MIP image MP2 (refer to FIG. 17) may be displayed after subjecting this region of interest to a MIP process. In the present embodiment, the observation subject is a plurality of blood vessels on the surface of an organ.

Figure 10:
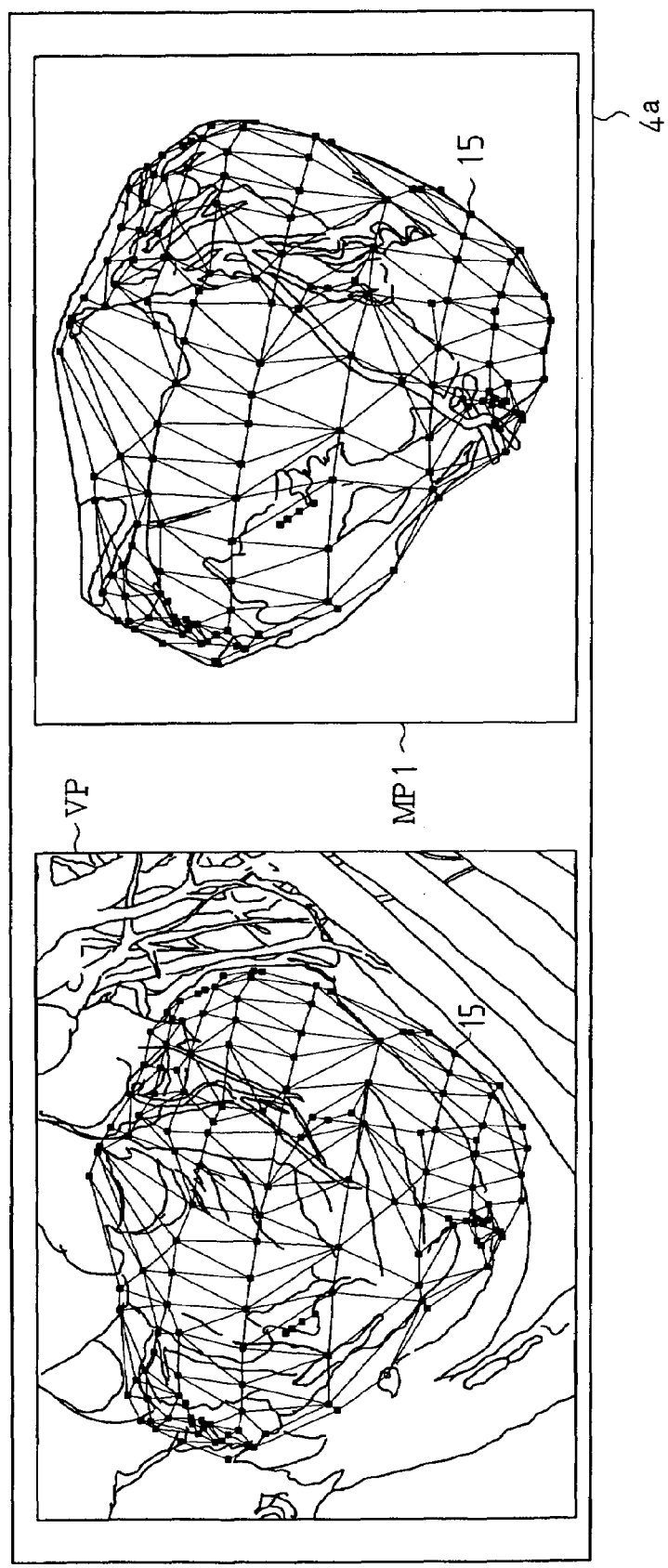
FIG. 10 illustrates a MIP image after a region of interest designating process in the first embodiment.

The region of interest designating process designates a region of interest having a predetermined thickness from the VR image VP (volume data VD). A user can designate, in the region of interest designating process, arbitrary designation points 15 in the coordinates of a plurality of pixels having three-dimensional coordinates configuring the VR image VP (volume data VD), as shown in FIG. 10, by clicking the mouse on the VR image VP displayed on the screen 4a of the monitor 4. Then, a region of interest is generated by generating a curved surface including the arbitrary designation points 15 by means of a curved surface generating process, which will be described later, and setting the a predetermined thickness for this curved surface. The region of interest designating process may be executed for not only the VR image VP but also on the volume data VD and images obtained by other image processing methods. However, to facilitate the description, the region of interest designating process is performed on the VR image VP in the present embodiment.

A plurality of VR images are prepared. The VR images are associated with one another and generated for a plurality of different viewpoints from the same volume data VD (for example, images viewed from the front and images viewed from above). The regions of interest may be generated from all arbitrary three-dimensional surfaces by specifying arbitrary designation points in the plurality of VR images.

Regions of interest may easily be generated for all arbitrary three-dimensional surfaces by specifying coordinates of the voxel data corresponding to points on a two-dimensional cross-section, which is represented by an axial view (image viewed from above or below), a sagittal view (image viewed from the side), and a coronal view (image viewed from the front) relative to the same voxel data on the screen 4a.

That is, these specified arbitrary designation points are stored in the designation point memory unit A of the memory 8 together with the respective three-dimensional coordinates. Therefore, when, for example, a VR image is displayed from different viewpoints on the screen 4a in accordance with the change in viewpoint, the arbitrary designation points are displayed on the VR image after the viewpoint change by applying the once specified arbitrary designation points on the VR image. That is, these arbitrary designation points have three-dimensional coordinates, and the specification of these arbitrary designation points may be accomplished not just for the surfaces of the three-dimensional body displayed on the screen 4a, but also for all surfaces of the three-dimensional body, such that a region of interest may be designated as in a three-dimensional membrane along the surface of an arbitrary three-dimensional body.

FIGS. 4 to 7 illustrate the curved surface generating process for connecting a plurality of designation points and generating an arbitrary curved surface including those designation points. To facilitate description, the illustration of the VR image VP is omitted in FIGS. 4 to 7.

For example, when a plurality of designation points 21, 22, 23, 24, 25, and 26 are sequentially specified on the VR image, as shown in FIG. 7, the CPU 7 assumes a tangential spherical surface 28 of the plurality of designation points 21 to 26, as shown in FIG. 5. Then, when a light source 30 is assumed at the center of the tangential spherical surface 28, the plurality of designation points 21 to 26 are respectively projected from the light source 30 on the tangential spherical surface 28, as shown in FIG. 6. Next, two-dimensional Delaunay division (Delaunay 2D) is performed on the tangential spherical surface 28.

That is, adjacent designation points among the plurality of projected designation points 21 to 26 (hereinafter referred to as 'projected designation points 21a to 26a) are connected to one another, and the connective relationships are stored in the connective relationship memory unit C of the memory 8. Then, the connective relationships of the projected designation points 21a to 26a are applied in the plurality of original designation points 21 to 26, as shown in FIG. 7. Accordingly, the connective relationships are automatically set. That is, since the designation points 21a to 26a projected on the tangential spherical surface 28 are connected, the curved surface including surface irregularities may be automatically set as a curved surface configured by a convex hull, such as the surface of an organ. Therefore, even when designation points are added to the curved surface after the curved surface has been once generated, these added designation points are not individually connected to the curved surface that includes the designation points 21 to 26. Rather these designation points are connected so as to generate a curved surface of a polygon including these designation points in addition to the designation points 21 to 26. Furthermore, the polygonal shape is not limited to convex polygonal shapes.

Furthermore, the connective sequence can be determined even when designation points are more depressed (located closer to the center of gravity), as in the case of designation point 25, than the other designation points 21 to 24, and 26. That is, when the designation point 25 is more depressed than the other designation points 21 to 24, and 26, there is a possibility that the designation point 23 might be connected to either designation point 25 or designation point 26 with the conventional methods. Accordingly, a desirable curved surface cannot be obtained since the designation point 23 is automatically connected to the designation points 25, or 26. However, the connective relationship can be determined when the designation point 25 is more depressed than the other designation points 21 to 24 and 26 by connecting the adjacent projected designation points 21a to 26a on the tangential spherical surface 28 and applying the connective relationship to the designation points 21 to 26 by the previously mentioned curved surface generating method.

The aforesaid process resolves problems that occur when using conventional methods such as Delaunay 3D. Such problems include difficulty of obtaining the same result if depressed locations are included in connecting designations, inability of processing when depressed locations are present, and a large change in the curved surface generated by adding designation points.

Since the region generated by connecting the designation points 21 to 26 in this way is a three-dimensional body, a hidden surface removal process is necessary if the region is drawn on a two-dimensional surface. This is because it is difficult to understand the anterior-posterior relationship from the viewpoint. Furthermore, since the region generated in the present embodiment is three dimensional volume and not a surface, the hidden surface removal process means, such as, for example, the Z-buffer method used in surface rendering, cannot be employed.

Figure 8:
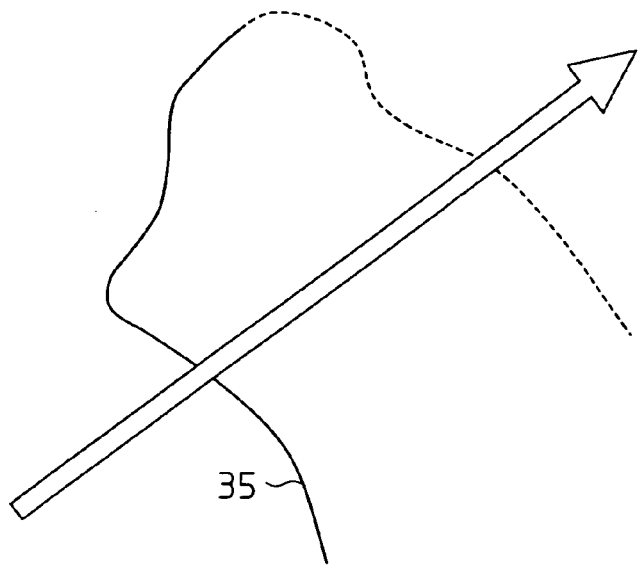
FIG. 8 illustrates a hidden surface removal process of the first embodiment.

Therefore, in the present embodiment, a hidden surfaces elimination process is performed on the curved surface of the displayed VR image VP to match the change in viewpoint, and the plotted region, that is, surface positioned to the forefront from the viewing direction in FIG. 8 (arrow direction in FIG. 8) is selected as a subject region of interest, that is, the plotted region 35 (solid line area in FIG. 8). Then, the plotted region 35 is stored in the plotted region memory unit DM.

The plotted region 35 generated in this way is set as a region of interest by setting a thickness T (refer to FIG. 11) as the predetermined thickness. In the present embodiment, a thickness T is stored beforehand in the temporary memory unit 8a and is added to both of the inside and outside of the curved surface. However, a thickness T may also be added only to the outside of an arbitrary curved surface. Furthermore, a user may specify the thickness T to conform to the observation subject and observation accuracy.

A MIP image is generated by subjecting the generated region of interest to MIP processing.

Figure 9:
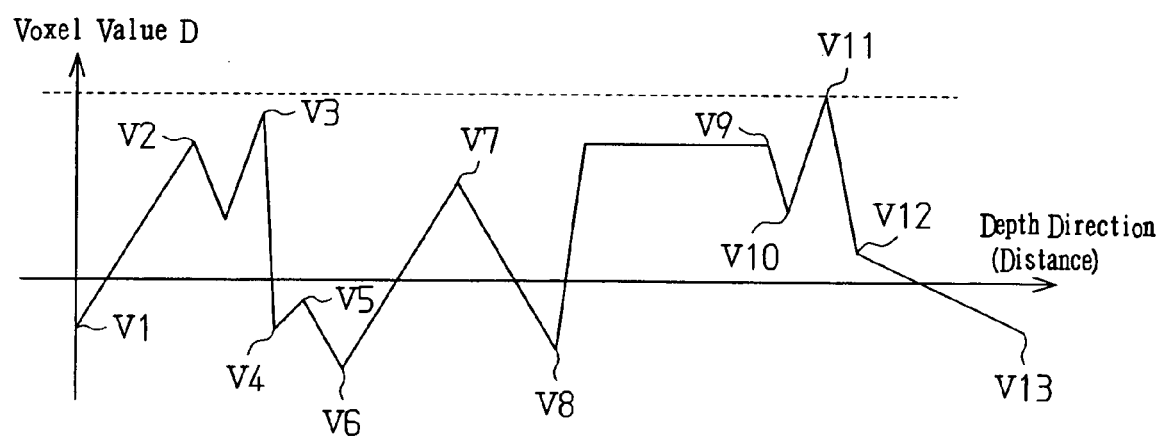
FIG. 9 illustrates a MIP value of one pixel in the first embodiment.

FIG. 9 shows the MIP process for generating a MIP image.

MIP is the abbreviation for maximum intensity projection. MIP is one method for volume rendering. For example, in the case of parallel projective methods, a ray (virtual ray) R radiates from the viewing direction to the volume data VD observation subject at each pixel of a two-dimensional frame F, as shown in FIG. 3. Then, the maximum value (hereinafter, 'MIP value') of the voxel values D1, D2, ... Dn of N voxels V1, V2, ... Vn on the ray R is set as two-dimensional image data.

That is, the projected two-dimensional image data differs even when the same volume data VD is the observation subject depending on the direction of the ray R. Moreover, an image can be obtained, for example, such as when viewing the inside of a tubular organ like a blood vessel through an endoscope by radiating rays R radially from one certain viewpoint toward the voxel data, as in the central projection method. Further, an image can be obtained such as when exfoliating the inside of a tubular organ (for example, blood vessel, trachea, digestive tract and the like), for example, by radiating rays R radially to volume data VD from viewpoints distributed on a central path of a cylinder relative to a cylinder surface hypothetically circumscribing the volume data VD. In the present embodiment, the parallel projective method is most appropriate for observing the exterior of volume data. When the ray destination position is not on a grid, an interpolation process is performed from a voxel value D of a peripheral voxel V, and the voxel value D is calculated at that position.

Specifically, the voxel values D1 to Dn of the voxels V1 to Vn for one pixel may be expressed, for example, as shown in FIG. 9. FIG. 9 represents a voxel value D of voxel V, through which the ray R passes when a single ray R is radiated from the viewing direction for each pixel, and corresponds to the single ray R in FIG. 3. The depth (distance) of the voxel V is shown on the horizontal axis, and the voxel value D is shown on the vertical axis. As shown in FIG. 9, a certain pixel Pn has thirteen voxels V1 to V13 on the ray R. Since the voxel value D11 of the voxel 11 is the largest value, this value is the MIP value of the pixel Pn and is stored in the MIP value grid memory unit VG corresponding to the pixel Pn.

The position of the voxel V11, that is, the tree-dimensional grid point of the voxel with a MIP value of voxel value D, is stored as the MIP position in the MIP position grid memory unit PG corresponding to the pixel Pn. The MIP position grid memory unit PG functions in the same manner as a Z-buffer in the Z-buffer method in that depth information (distance) corresponding to two-dimensional image data is stored. However, in the Z-buffer method, only data in the forefront side is displayed as two-dimensional image data. In a MIP image, the highest data of the pixel values is displayed as two-dimensional image data regardless of the depth information (distance). This distance is not limited to Euclidean distance, and may include typical non-Euclidean distance, such as only z-direction distance, distance weighted in a direction, and the like.

In the same manner, MIP values are determined for all pixels in the plotted region 35 and stored in the MIP value grid memory unit VG. The MIP positions corresponding to all MIP values of all pixels of the MIP image are stored in the MIP position grid memory unit PG.

When the plotted region 35 is specified in this way, a VR image VP and a MIP image MP1 obtained by MIP processing of the plotted region 35 specified on the VR image VP are displayed together with a plurality of user-specified designation points 15 on the screen 4a of the monitor 4, as shown in FIG. 10. Whether or not to display the plurality of designation points 15 (plotted region 35) may be selected by the user, such that the VR image VP and MIP image MP2 are displayed side by side on the screen 4a, as shown in FIG. 17. When, for example, viewing a blood vessel in the surface of an organ as an observation subject in the MIP image MP2, the blood vessel does not normally continue on the surface of the organ.

Thus, the blood vessel may not be located on the curved surface generated by specifying designation points on the VR image VP in the depth direction of the line of sight.

MIP processing is performed on a region of interest on a curved surface having a set thickness T in the present embodiment. Thus, an observation subject within the region of interest can be displayed in the MIP image even when it is not on the curved surface. Therefore, as long as a MIP point of the observation subject within the region of interest is specified as a new designation point (region of interest re-designation process) even if it is not on the curved surface, a curved surface including the new designation point, that is, a new curved surface containing the observation subject, can be generated.

Specifically, the region of interest re-designation process re-designates a region of interest in a MIP image obtained by MIP processing of a region of interest specified by the region of interest designating process. In the present embodiment, for example, part of the observation subject 41 is located in the region of interest 45, as shown in FIGS. 11 to 14. FIGS. 11 to 14 illustrate the positional relationships of the observation subject 41, the region of interest, and the depth direction (Z direction) of the curved surface.

Figure 11:
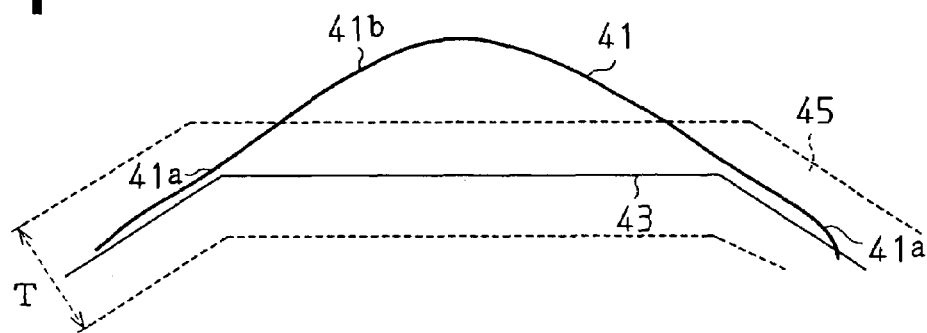
FIGS. 11 to 14 illustrate a region of interest re-designating process of the first embodiment.

As shown in FIG. 11, the entire observation subject 41 is not on the curved surface 43. However, since a part 41a is in the region of interest 45, that part 41a is displayed on the MIP image MP2. A part 41b of the observation subject 41 is outside the region of interest 45 and is not displayed on the MIP image MP2 (refer to FIG. 17). Thus, the observation subject 41 is displayed on the MIP image MP2 with this part interrupted. A user clicks the omitted part of the observation subject 41 with the mouse 6 while viewing the MIP image MP2. Since the MIP position of the coordinates of an arbitrary pixel is designated as a new designation point 47 by specifying the coordinates of the arbitrary pixel in the MIP image MP2 from MIP positions corresponding to pixels displayed as the MIP image MP2, the new designation point 47 is stored in a designation point memory unit A of the memory 8.

Figure 12:
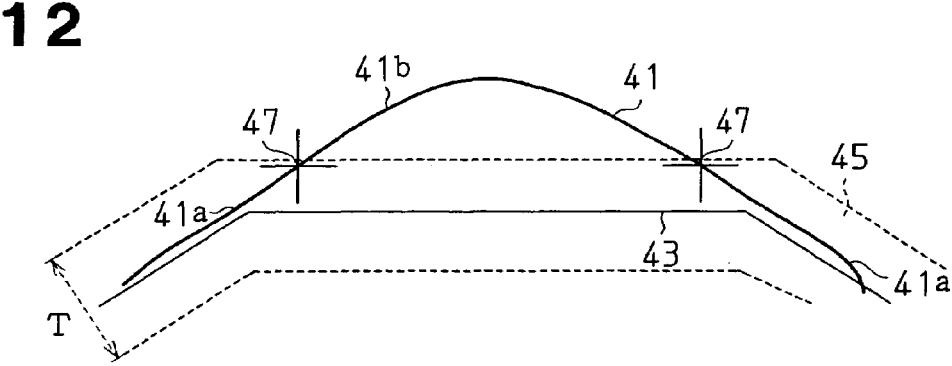
Figure 13:
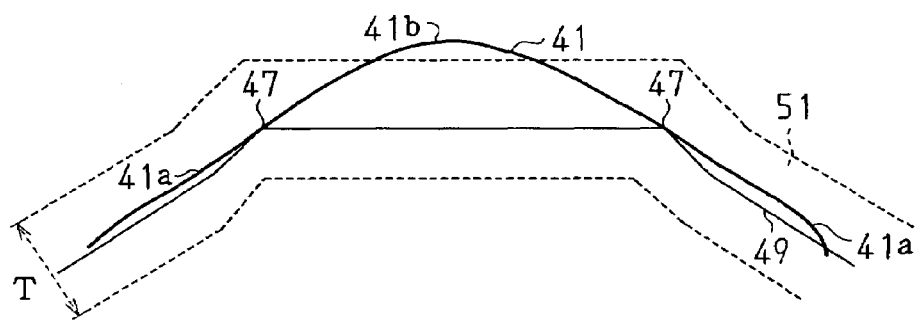
Figure 14:
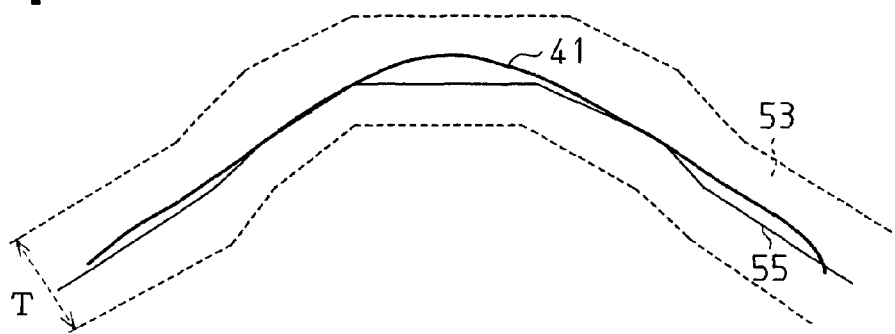

Since the new designation point 47 is within the region of interest 45 but not on the curved surface 43, the MIP value of the new designation point 47 is displayed on the MIP image MP2, as shown in FIG. 12. Then, a new curved surface 49 including the new designation point 47 is generated as shown in FIG. 13 by executing the previously described curved surface generating process on the new designation point 47, and a new region of interest 51 is generated by setting the predetermined thickness T for the new curved surface 49. Since the new region of interest 51 includes most of the observation subject 41, the MIP process is executed again and the resulting displayed MIP image includes most of the observation subject 41. The entirety of a desired observation subject 41 may be located within a region of interest 53, as shown in FIG. 14, by repeating this process and generating a new curved surface 55, that is, a desired observation subject 41 can be displayed as a MIP image MP2 (refer to FIG. 17).

Since the VR image VP is displayed on a two-dimensional frame, when new designation points are specified in the VR image VP on the screen 4a of the monitor 4, a means is required to determine the depth information (z coordinates) of the designation point specified by the mouse click of the user. For example, in the case of a MIP image, when specifying a new designation point in the MIP image MP2 on the screen 4a of the monitor 4 in the same manner, the depth information may be specified while the image is displayed on a two-dimensional frame since the depth information (z coordinates) of the pixels configuring the MIP image are stored as MIP positions. Furthermore, the coordinates of the MIP position may be associated with the three-dimensional coordinates of each pixel of the VR image VP since the MIP position is a three-dimensional coordinate associated with the volume data VD. That is, a curved surface designated on the VR image VP, or a plotted region 35, may be re-designated and re-generated so as to allow the observation subject 41 to be viewed on the MIP image by setting the MIP position as a new designation point.

In this state, the designation points may be specified in an arbitrary sequence without regard to the connective sequence of the designation points. Thus, the new designation point is added to the MIP image MP2 after the curved surface has been once generated such that a new curved surface is generated to include the added point relative to the original curved surface.

As shown in FIG. 2, the calculator (computer) 3 includes a GPU (graphics processing unit) 10. The GPU 10 is a graphics controller chip mainly supporting three-dimensional high-speed graphics functions. The chip provides the function of high-speed drawing of two-dimensional and three-dimensional graphics based on the programs employed by the user. In the present embodiment, post processing is executed by the GPU 10. Thus, the time required to display the MIP images MP1 and MP2 is reduced.

Post processing corrects the color, contrast, and brightness of the calculated MIP images MP1 and MP2 displayed on an output device such as the monitor 4. Specifically, the output (CT image, MRI image and the like) of many medical imaging devices is 12-bit tone data. Thus, the MIP images MP1 and MP2 (MIP values stored in the MIP value grid memory unit VG) calculated by the MIP processing are also 12-bit tone data, and the monitor 4 of the computer 3 often displays images that express RGB in 8-bits. Therefore, WL transformation (window level transformation) and LUT transformation (color look-up table transformation) are performed to convert the color, contrast and brightness so as to be displayable on the monitor 4. Affine transformation is also performed to match the size of the screen such that the transformation can be displayed n the monitor 4.

The operation of the region of interest designating process will now be described.

Figure 15:
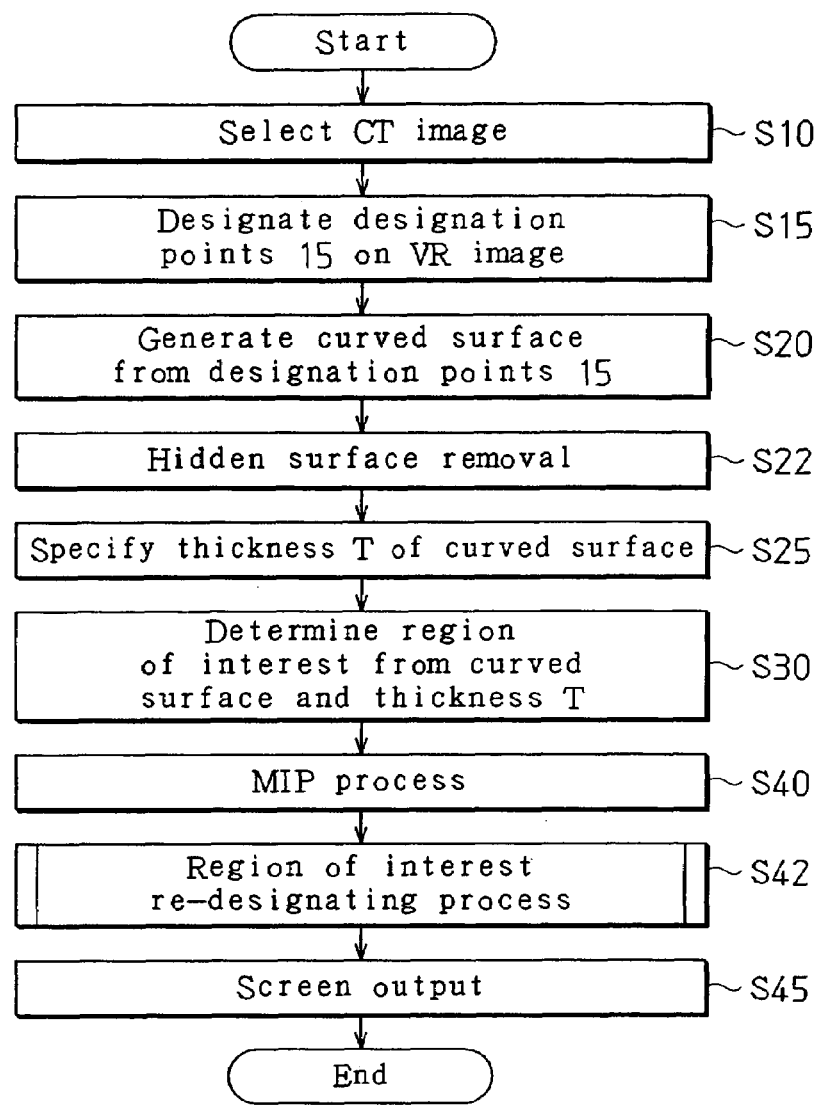
FIGS. 15 and 16 are flowcharts illustrating the region of interest designating process of the first embodiment.

FIG. 15 is a flowchart of the region of interest designating process. When a user wishes to generate a MIP image MP1, the user operates the keyboard 5 and mouse 6 to select a CT image that is desired to generate the MIP image MP1 from among a plurality of CT images displayed on the screen 4a (refer to FIG. 1) of the monitor 4 (step S10). Specifically, since the CT image is a plurality of slice images, the user specifies a range from the slice images from which to generate the MIP image MP1. Volume data VD is generated from the specified slice images and stored in the temporary memory 8a. The VR image VP obtained by subjecting the volume data VD to a volume rendering process is stored in the temporary memory 8a.

When a user specifies a plurality of designation points by clicking the VR image VP using the mouse (step S15), the CPU 7 generates a curved surface including the plurality of designation points by means of the curved surface generating process (step S20). Then, the obtained curved surface is subjected to a hidden surface removal process (step S22), and only the region to the forefront in the line of sight direction is stored as a plotted region 35 in the plotted region memory unit DM of the memory 8. In the present embodiment, the hidden surface removal process is executed each time a designation point changes. A thickness T is set for the plotted region 35 (step S25). That is, a predetermined thickness T is read from the temporary memory unit 8a and set for the curved surface. This determines the region of interest (step S30). Then, the region of interest is subjected to MIP processing (step S40), and the GPU 10 performs post processing to obtain the MIP images MP1 and MP2. The MIP image MP2 is subjected to the region of interest re-designation process (step S42).

Figure 16:
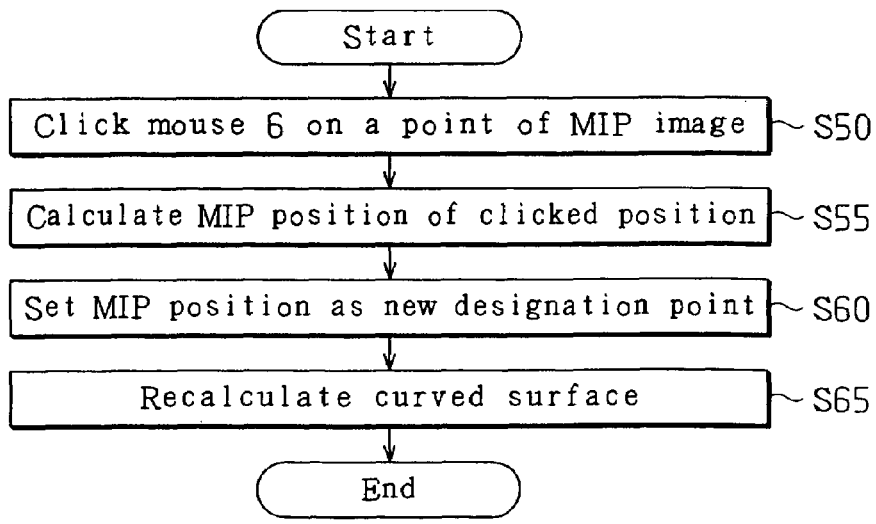

The region of interest re-designation process will now be described with reference to FIG. 16.

First, the user clicks the mouse 6 on the MIP image MP2 generated by the region of interest regeneration process (step S50). Then, the MIP value corresponding to the clicked position is determined (step S55). Since the MIP position is represented as a three-dimensional coordinate, the three-dimensional coordinate corresponding to that MIP position in the VR image VP is set as the new designation point 47 and stored in the designation point memory unit A (step S60). Then, the newly obtained designation point 47 is subjected to the original curved surface generating process, and the curved surface is recalculated (step S65). After the curved surface has been recalculated, the CPU 7 executes the region of interest designating process. The user repeats the appropriate region of interest designating process and region of interest re-designating process until a MIP image MP2 is obtained in which the desired observation subject can be seen. Then, the MIP image MP2 that includes the desired observation subject is displayed together with the VR image VP on the screen 4a of the monitor 4, as shown in FIG. 17 (step S45 in FIG. 15). In this state, the MIP image MP2 and VR image VP that includes the designation point 15 and new designation point 47 (refer to FIG. 10) may be displayed side by side on the screen 4a. This easily associates the MIP image MP2 displayed on the screen 4a with the MIP image of the relevant part of the VR image VP. The MIP image MP2 also may be displayed alone on the screen 4a.

In this manner, a region of interest including an observation subject may accurately be specified while performing the simple operation of clicking the mouse 6 in an arbitrary sequence on the region a user wants to display on the VR image VP. Furthermore, for example, when a plurality of blood vessels are observed on a complex curved surface such as the surface of an organ, the blood vessels may simultaneously be observed in a single region without individually specifying and observing the surfaces of the plurality of blood vessels.

In the case of the heart, in which the MIP value is higher within the heart where blood is present than in the blood vessels on the surface of the heart, only the interior of the heart is displayed as a MIP image when the entire heart is subjected to MIP processing. However, by generating a three-dimensional membrane along the surface of the heart, only the blood vessels on the surface of the heart, or only the desired observation region, may be displayed as a MIP image. Moreover, since the region of interest (plotted region 35) on the obtained MIP image may be re-designated, the accuracy of designating a region of interest in the depth direction is especially improved.

The present embodiment has the advantages described below.

(1) A predetermined thickness T is provided for a curved surface having a complex shape, such as the surface of an organ, and designated as a region of interest, a plotted region 35 at the forefront in the line of sight direction in the region of interest is subjected to MIP processing. As a result, for example, a curved surface including a plurality of blood vessels on the surface of an organ can be observed simultaneously in a single MIP image MP2 without requiring a user to specify each blood vessel.

(2) Part of a surface having a complex shape, such as a convoluted organ, may be specified as a region of interest by simply clicking the mouse 6 on the region the user wants to display on the VR image VP displayed on the screen 4a.

(3) Curved surface generation is automated since the designation points 15 (21 to 26) are connected so as to form a predetermined polygonal convex shape regardless of the sequence of specifying designation points for generating the curved surface.

(4) The sequence of specifying designation points 15 (21 to 26) for curved surface generation is not related to the sequence for connecting the respective designation points 15, and the designation points 15 are respectively connected so as to form a predetermined polygonal convex shape. As a result, when a new designation point 47 is added after the curved surface has been generated once, a new curved surface may be generated so as to form a polygonal convex shape that includes the new designation point 47. Therefore, a curved surface is first roughly specified. Then, the curved surface is sequentially specified in more detail for any number of times so that the specified curved surface matches the observation subject and the required accuracy.

(5) Three-dimensional coordinates are used to designate a curved surface in a surface of an organ having more than one degree of freedom with respect to planes and curves, and a region of interest having a predetermined thickness T is designated for the curved surface. This enables the designation of a three-dimensional region of interest. Therefore, an observation subject on the surface of a three-dimensional subject, such as, for example, the surface of an organ, may be observed as MIP images MP1 and MP2.

(6) Only the region of interest in the forefront in the line of sight is specified as the plotted region 35, and MIP images MP1 and MP2 are generated by subjecting this plotted region 35 to MIP processing. Thus, a desired observation subject may be displayed even when it is difficult to comprehend the anterior-posterior relationship of the MIP images MP1 and MP2.

(7) The curved surface is provided with a predetermined thickness T. Thus, an observation subject that is positioned within the region of interest but not on the curved surface may be displayed in the MIP images MP1 and MP2 by subjecting the region of interest to MIP processing.

(8) The MIP position of coordinates of a pixel on the MIP images MP1 and MP2 at a position clicked by the mouse 6 may be designated as a new designation point 47. By generating a new curved surface including the new designation point 47, the observation subject may be shown on the new curved surface.

(9) Designation points may be specified on the VR image VP and on the MIP images MP1 and MP2. Further, the specified designation points may be connected to one another by three-dimensional coordinates. As a result, a region of interest may be generated using the curved surface prepared by specifying arbitrary points on the VR image VP, and the region of interest may be subjected to MIP processing to generate the MIP images MP1 and MP2. Then, a new region of interest may be generated by specifying arbitrary points on the MIP image MP2. Therefore, the accuracy of the MIP images MP1 and MP2 is improved by checking whether an image having the desired accuracy is obtained while observing the final MIP images MP1 and MP2.

Second Embodiment

In the first embodiment, a calculator (computer) 3, such as a single workstation or the like, independently performs the region of interest designating process, the MIP process, and the region of interest re-designating process. In the second embodiment, a plurality of computers perform distributed processing for at least one of the region of interest designating process, the MIP process, and the region of interest re-designating process. In the following embodiment, like or same reference numerals are given to those components that are the same as the corresponding components of the first embodiment and will not be described in detail.

Figure 18:
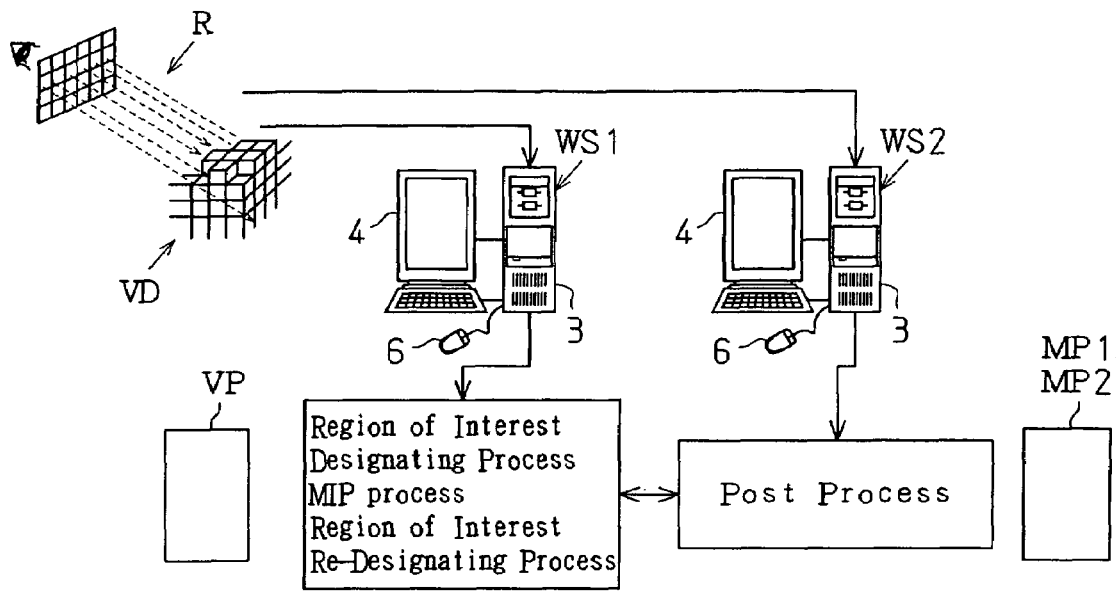
FIG. 18 is a block diagram showing a dispersion process of a region of interest designating process according to a second embodiment of the present invention.
Figure 19:
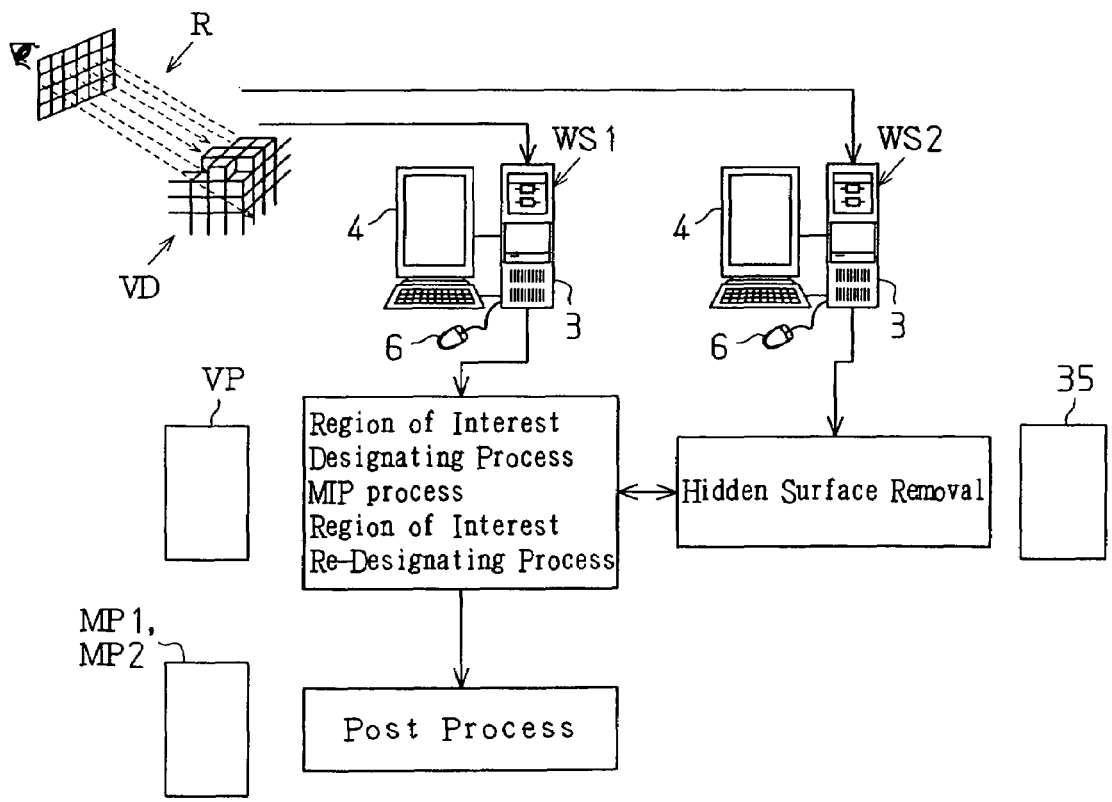
FIG. 19 is a block diagram showing the dispersion process of the region of interest designating process in the second embodiment.

For example, in a network for a hospital having a plurality of connected workstations, at least one process is performed by a plurality of workstations through distributed processing. Two examples of distributed processing of the region of interest designating process, the MIP process, and the region of interest re-designating process will be described below, one example being a case in which only the post processing is divided, and the other example being a case in which only the hidden surface removal process is divided. To facilitate the description, the examples illustrate the generation of a 512× 512 image with two workstations WS1 and WS2, as shown in FIGS. 18 and 19. However, the distributed processing may also be performed by more computers. In the present embodiment, the GPU 10 is only installed in the workstation WS2.

EXAMPLE 1

Example 1 describes the division of post processing. As shown in FIG. 18, in this case the workstation WS1 performs the region of interest generating process, MIP process, and region of interest regenerating process. If the workstation WS2, which incorporates the GPU 10 that is suitable for high-speed processing, performs the post processing, the time required for post processing is reduced. The procedures of the process are described below.

(1-1) The workstation WS1 performs the region of interest generating process and the MIP process on the VR image VP obtained by subjecting the volume data VD on the ray R to a volume rendering process. Then, the MIP values obtained by the MIP process are transferred to the workstation WS2 and stored in the MIP value grid memory unit VG of the workstation WS2.

(1-2) The workstation WS2 performs post processing on the MIP values stored in the MIP value grid memory unit VG to obtain MIP images MP1 and MP2 including the observation subject. Then, the obtained MIP images MP1 and MP2 are transferred to the workstation WS1.

(1-3) The workstation WS1 subjects the MIP image MP2 to the region of interest re-designating process and MIP process. Then, the MIP values obtained by the MIP process are transferred to the workstation WS2 and stored in the MIP value memory unit VG of the workstation WS2. In the same manner, the workstation WS2 performs post processing on the MIP values stored in the MIP value grid memory unit VG to obtain MIP images MP1 and MP2 including the observation subject.

EXAMPLE 2

Example 2 describes the division of the hidden surface removal process. As shown in FIG. 19, in this case all volume data VD are subjected to the region of interest generating process, the MIP process, and the region of interest re-designating process by the workstation WS1. If the workstation SW2, which incorporates the GPU 10 suitable for high-speed processing, performs the hidden surface removal process, the time required for the hidden surface removal process is reduced. The procedures of the process are described below.

(2-1) The workstation WS1 generates a VR image VP from volume data VD on the ray R, and subjects the VR image VP to the region of interest designating process. When the region of interest is specified, the region of interest is transferred to the workstation WS2, and the region of interest is stored in the region of interest memory unit I of the workstation WS2.

(2-2) The workstation WS2 performs the hidden surface removal process on the region of interest. After post processing, only the region in the forefront in the line of sight direction is sent to the workstation WS1 as the plotted region 35.

(2-3) The workstation WS1 performs MIP processing on the plotted region 35 and obtains MIP images MP1 and MP2 showing only the forefront in the line of sight. Then, the MIP image MP2 is subjected to a region of interest re-designating process. After the desired MIP image MP2 has been obtained, the MIP image MP2 is subjected to post processing. In this state, when post processing is performed by the workstation WS2 incorporating the GPU 10, the overall processing speed is increased.

The present embodiment has the advantages described below in addition to the advantages of the first embodiment.

(1) The speed of the region of interest designating process, the MIP process, and the region of interest re-designating process is improved through distributed processing using a plurality of calculators (computers) 3. Thus, the display of the MIP images MP1 and MP2 on the monitor 4 in real time is ensured.

(2) Distributed processing is performed by a plurality of calculators (computers) 3. Thus, the capacity of the memory 8 may be reduced.

It should be apparent to those skilled in the art that the present invention may be embodied in many other specific forms without departing from the spirit or scope of the invention. Particularly, it should be understood that the present invention may be embodied in the following forms.

In the second embodiment, networked distributed processing is accomplished by the workstations WS1 and WS2, which are connected by a network. However, distributed processing may also be accomplished by a plurality of processors installed in a single computer.

Although volume data is subjected to MIP processing in the above embodiments, MIP processing may be performed on volume data of four or more dimensions.

In the curved surface generating process of the above embodiments, a group of designation points are projected on a tangential spherical surface on the group of designation points, and a curved surface is generated by performing Delaunay 2D on the tangential spherical surface. However, the curved surface may also be generated through a active contour model. That is, a polygonal sphere including a group of designation points may be generated, a vector field for attracting the group of designation points may be generated, and a curved surface may be generated by moving points of the polygonal sphere onto the vector field. Furthermore, the level set method or other arbitrary curved surface generating algorithm may be used. That is, algorithms for generating a curved surface from points may be used.

Although the curved surface is represented as a polygon in the above embodiments, diverse representation methods other than a curved surface may be considered, such as an implicit function curved surface, a NURBS curved surface, a spline curved surface, and the like.

Although the methods for projecting three-dimensional data on a two-dimensional frame has been described in terms of MIP in the above embodiments, other methods may be considered. For example, MinIP (minimum intensity projection) may be used to project a minimum voxel value D of a ray R passing through a voxel V. Methods that project a voxel value D of a specific single voxel V among voxel values D of the voxels V through which the ray R passes may be used. For example, a voxel V having the second smallest voxel value among voxel values D of the voxels V through which the ray R passes or a voxel V having the maximum voxel value among the voxel values D of the voxels V through which the ray R passes may be used. Furthermore, volume render methods other than ray casting may be used.

Although the MIP method is used in the above embodiments to specify coordinates of designation points on a three-dimensional volume data from two-dimensional image data, other methods may be used. For example, the coordinate of a voxel V having a degree of opacity, which is determined from voxel value D of a voxel V through which the ray R passes, that exceeds a fixed value may be used. The coordinate of a specific single voxel V may be obtained from the voxels through which the ray R passes.

Although coordinates of a specific single voxel V among voxels V through which the ray R passes are used in the above embodiments to specify coordinates of designation points on a three-dimensional volume data from two-dimensional image data, the coordinates are not limited to a specific voxel V and may be the coordinates of points between a plurality of adjacent voxels V or coordinates derived from the coordinates of a voxel V.

Although coordinates of a specific single voxel V among voxels V through which the ray R passes are used in the above embodiments to specify coordinates of designation points on a three-dimensional volume data from two-dimensional image data, the coordinates may be derived from the coordinates of a plurality of voxels V, such as coordinates between a plurality of adjacent voxels V, rather than the coordinates of a single voxel V.

In the above embodiments, MIP is used to project volume data on a two-dimensional frame, and MIP is used in the same manner to specify coordinates of designation points on a volume data from two-dimensional image data. However, a combination of different methods may be used. For example, ray casting for projection on a two-dimensional frame may be combined with MinIP for specifying designation points.

In the above embodiments, the specification of designation points in the curved surface generating process, and the region of interest re-designating process are performed by a user command. However, in the curved surface generating process, the CPU 7 may automatically specify rough designation points. Then, a user command has fine adjustments performed through the region of interest re-designating process. This reduces the time the user spends specifying designation points, and an arbitrary curved surface is generated with higher accuracy. Methods using designation information of past designation points and methods using regions generated by region extraction of the surface of a region generated by region extraction may be considered as automatic processing.

In the above embodiments, the region of interest re-designating process in the curved surface generating process may be accomplished by user pointing a position in the two-dimensional image data and then calculate the pointed position on the volume data. This operation may also be performed directly on a two-dimensional image. For example, designation points may be re-designated since corresponding three-dimensional coordinates from a two-dimensional image can be determined by MPR and CPY two-dimensional frames, and axial, sagittal, and coronal two-dimensional frames. Furthermore, the coordinates of designation points can be re-specified numerically rather than through a two-dimensional image data.

In the above embodiments, the region of interest re-designating process in the curved surface generating process may be accomplished by user specification in the two-dimensional image data on the three-dimensional volume data, and the three-dimensional coordinates of the designation points may be determined by the MIP positions. The three-dimensional coordinates of the designation points may also be determined by determining the MinIP position. The MinIP position is the position of the minimum value of a voxel value D of voxels V through which the ray R passes.

In the above embodiments, the region of interest re-designating process in the curved surface generating process may be accomplished by user specification in the two-dimensional image data on the three-dimensional volume data, and the three-dimensional coordinates of the designation points may be determined by the MIP positions. Methods in which a user does not specify in the two-dimensional image data a three-dimensional volume data also may be used. For example, coordinates at which a voxel value first exceeds a fixed value may be used. Further, for example, coordinates obtained by using the degree of opacity of a voxel through the ray casting method may be used. Methods using the degree of opacity may use, for example, the coordinates of maximum opacity and coordinates at which the opacity first exceeds a fixed value, or combinations thereof.

In the above embodiments, a curved surface generated by a curved surface generating process has a predetermined thickness added thereto in order to generate a region of interest. The curved surface representing this result, and the thickness may be changed by a graphical user interface (GUI) in accordance with the desired accuracy.

In the above embodiments, the curved surface and region of interest (plotted region 35) are regenerated by adding a designation point to the MIP image MP1. However, in addition to just adding designation points to the MIP image MP1, designation points may also be edited, that is, designation points also may be moved or removed.

In the above embodiments, the hidden surface removal process sets only the region to the forefront in the line of sight direction in the region of interest as the plotted region 35. However, a region to the depth side in the line of sight direction may be plotted by radiating rays relative to a region of interest in the MIP process, outputting rays from the obtained region of interest, and suspending the MIP process.

Although the hidden surface removal process is used to plot the region of interest in the above embodiments, a region of interest restricted by the hidden surface removal process may be used to restrict the coordinates of the designation points during the region of interest re-designating process. Accordingly, it is possible to prevent setting the designation points in the region of interest re-designating process at locations the user does not intend on the curved surface.

Although the region of interest is generated by adding a fixed thickness to the curved surface in the above embodiments, the thickness may be changed by the user or by a program specification. A new designation point may be accurately specified by changing the thickness when specifying a new designation point.

Although the designation points are set on the inside of the region of interest when the designation points are re-designated, the present invention is not necessarily limited to this arrangement. For example, a user clearly specifies individual coordinates among three-dimensional coordinates when the user specifies a new designation point by specifying a point on a two-dimensional frame. Thus, re-designation of the designation points is performed in accordance with the user intention without a special restricting process.

Although the same curved surface is generated regardless of the sequence in which the designation points are specified in the curved surface generating process in the above embodiments, a different curved surface may be generated. In this case, a curved surface with a high degree of freedom may be generated by connecting the designation points in a sequence specified by the user or the program.

In the above embodiments, a user specifies a new designation point 47 in the MIP image MP1 displayed together with the specified designation points in the region of interest re-designating process. However, the new designation point 47 may be specified on the MIP image MP2 that does not display the specified designation points.

Although the MIP process is performed using CT image data of part of a human body, such as a bone, an organ, or the like in the above embodiments, the present invention is not limited to living tissue, such as humans, animals, and plants insofar as such material can be CT imaged, and the present invention is applicable to geologic examinations, mineral examinations, structural parts of machinery and devices, image processes for viewing electrical circuit patterns, and LSI diagnostics and the like.

The present examples and embodiments are to be considered as illustrative and not restrictive, and the invention is not to be limited to the details given herein, but may be modified within the scope and equivalence of the appended claims.

What is claimed is:

1. A method for designating a region of interest of a subject from volume data of the subject through at least one of sole processing and dispersed processing performed by at least one computer, the volume data of the subject including coordinates of voxels and having three or more dimensions, the method comprising:
    designating a plurality of designation points from the coordinates of the voxels with the at least one computer;
    connecting the designation points to generate a curved surface including the designation points with the at least one computer; and
    designating the region of interest by adding a thickness to the curved surface with the at least one computer.

2. The method according to claim 1, further comprising:
    generating a two-dimensional image of the subject by projecting the volume data with the at least one computer; and
    re-designating the region of interest in accordance with a designation point that is additionally designated from the coordinates of voxels corresponding to points on the two-dimensional image with the at least one computer.

3. The method according to claim 2, wherein said re-designating the region of interest includes:
    setting a ray directed toward the region of interest from the points on the two-dimensional image;
    designating a new designation point having a coordinate of a voxel lying along an extension of the ray in the region of interest; and
    generating a new curved surface including the new designation point and the plurality of designation points and adding the thickness to the new curved surface to designate a new region of interest with the at least one computer.

4. The method according to claim 3, wherein each voxel has a value, and the coordinate of the new designation point is the coordinate of the one of the voxels lying along the extension of the ray and having the maximum value.

5. The method according to claim 3, wherein each voxel has a value, and the coordinate of the new designation point is the coordinate of the one of the voxels lying along the extension of the ray and having the minimum value.

6. The method according to claim 1, wherein the region of interest is the same regardless of the designation sequence of the plurality of designation points.

7. The method according to claim 1, further comprising:
    editing some of the designation points.

8. The method according to claim 7, further comprising:
    changing the curved surface in accordance with the editing of the designation point.

9. The method according to claim 1, wherein the curved surface is at least part of a convex hull.

10. The method according to claim 1, wherein the curved surface includes a concave.

11. The method according to claim 1, further comprising:
    performing a hidden surface removal process to allocate a hidden surface to one region of the curved surface with the at least one computer.

12. The method according to claim 11, wherein the hidden surface removal process selects a region of the curved surface that is located forefront in a line of sight direction as the curved surface used when generating the subject region of interest.

13. The method according to claim 12, wherein the hidden surface removal process is performed when the line of sight direction changes.

14. The method according to claim 1, wherein the volume data of three of more dimensions includes an organ.

15. The method according to claim 1, further comprising:
    displaying on a screen a graphical user interface which changes the thickness.

16. The method according to claim 1, further comprising:
    displaying on a screen a volume rendered image of the subject in correspondence with the region of interest.

17. A method for designating a curved surface layer of an internal organ to visualize a volume rendered image of the curved surface layer with at least one computer, the method comprising:
    storing voxel data of the internal organ with voxel values, which correspond to a physical property of the internal organ, and coordinate values in the at least one computer;
    generating a two-dimensional or volume rendered image of the internal organ from the voxel data to display the two-dimensional or volume rendered image on a screen with the at least one computer;
    designating a plurality of designation points on the displayed two-dimensional or volume rendered image as instructed by a computer operator with the at least one computer;
    connecting the designation points by a closed line with the at least one computer;
    determining a curved surface including the designation points and the closed line with the at least one computer; and
    adding a thickness to the curved surface to determine a three-dimensional plotted region corresponding to the surface layer of the internal organ with the at least one computer; and
    generating a volume rendered image of the curved surface layer of the internal organ corresponding to the determined three-dimensional plotted region in accordance with voxel data having coordinates corresponding to the determined three-dimensional plotted region.

18. A computer readable program product comprising computer readable media storing program code for designating a three-dimensional region of interest of a subject from volume data of the subject through at least one of sole processing and dispersed processing performed by at least one computer, the volume data of the subject including coordinates of voxels and having three or more dimensions, wherein the program code when executed by the at least one computer performs steps including:

designating a plurality of designation points from the coordinates of the voxels with the at least one computer;

connecting the designation points to generate a curved surface including the designation points with the at least one computer; and designating the three-dimensional region of interest by adding a thickness to the curved surface with the at least one computer.

19. The computer readable program product according to claim 18, wherein the program code when executed by the at least one computer further performs steps including:

generating a two-dimensional image of the subject by projecting the volume data with the at least one computer; and re-designating the region of interest in accordance with a designation point that is additionally designated from the coordinates of voxels corresponding to points on the two-dimensional image with the at least one computer.

20. The computer readable program product according to claim 19, wherein said re-designating the region of interest includes:

setting a ray directed toward the region of interest from the points on the two-dimensional image;

designating a new designation point having a coordinate of a voxel lying along an extension of the ray in the region of interest; and generating a new curved surface including the new designation point and the plurality of designation points and adding the thickness to the new curved surface to designate a new region of interest with the at least one computer.

21. The computer readable program product according to claim 20, wherein each voxel has a value, and the coordinate of the new designation point is the coordinate of the one of the voxels lying along the extension of the ray and having the maximum value.

22. The computer readable program product according to claim 20, wherein each voxel has a value, and the coordinate of the new designation point is the coordinate of the one of the voxels lying along the extension of the ray and having the minimum value.

23. The computer readable program product according to claim 18, wherein the region of interest is the same regardless of the designation sequence of the plurality of designation points.

24. The computer readable program product according to claim 18, wherein the program code when executed by the at least one computer further performs:

editing some of the designation points.

25. The computer readable program product according to claim 24, wherein the program code when executed by the at least one computer further performs:

changing the curved surface in accordance with the editing of the designation point.

26. The computer readable program product according to claim 18, wherein the curved surface is at least part of a convex hull.

27. The computer readable program product according to claim 18, wherein the curved surface includes a concave.

28. The computer readable program product according to claim 18, wherein the program code when executed by the at least one computer further performs steps including:

performing a hidden surface removal process to allocate a hidden surface to one region of the curved surface with the at least one computer.

29. The computer readable program product according to claim 28, wherein the hidden surface removal process selects a region of the curved surface that is located forefront in a line of sight direction as the curved surface used when generating the subject region of interest.

30. The computer readable program product according to claim 29, wherein the hidden surface removal process is performed when the line of sight direction changes.

31. The computer readable program product according to claim 18, wherein the volume data of three of more dimensions includes an organ.

32. The computer readable program product according to claim 18, wherein the program code when executed by the at least one computer further performs:

displaying on a screen a graphical user interface which changes the thickness.

33. A computer system comprising at least one computer for designating a region of interest of a subject from volume data of the subject through at least one of sole processing and dispersed processing, the volume data of the subject including coordinates of voxels and having three or more dimensions, wherein the at least one computer includes:

means for designating a plurality of designation points from the coordinates of the voxels;

means for generating a curved surface including the designation points by connecting the designation points; and means for designating the region of interest by adding thickness to the curved surface.

34. The computer system according to claim 33, wherein the at least one computer further includes:

means for generating a two-dimensional image of the subject by projecting the volume data; and means for re-designating the region of interest in accordance with a designation point that is additionally designated from the coordinates of voxels corresponding to points on the two-dimensional image.

35. The computer system according to claim 34, wherein the means for re-designating the region of interest:

sets a ray directed toward the region of interest from the points on the two-dimensional image;

designates a new designation point having a coordinate of a voxel lying along an extension of the ray in the region of interest;

generates a new curved surface including the new designation point and the plurality of designation points; and adds the thickness to the new curved surface to designate a new region of interest.

36. The computer system according to claim 34, wherein the at least one computer includes a graphics processing unit functioning as at least part of the designating means, the curved surface generating means, the region of interest designating means, the projection surface generating means, and the region of interest re-designating means.

* * * * *